UNITED STATES PATENT OFFICE.

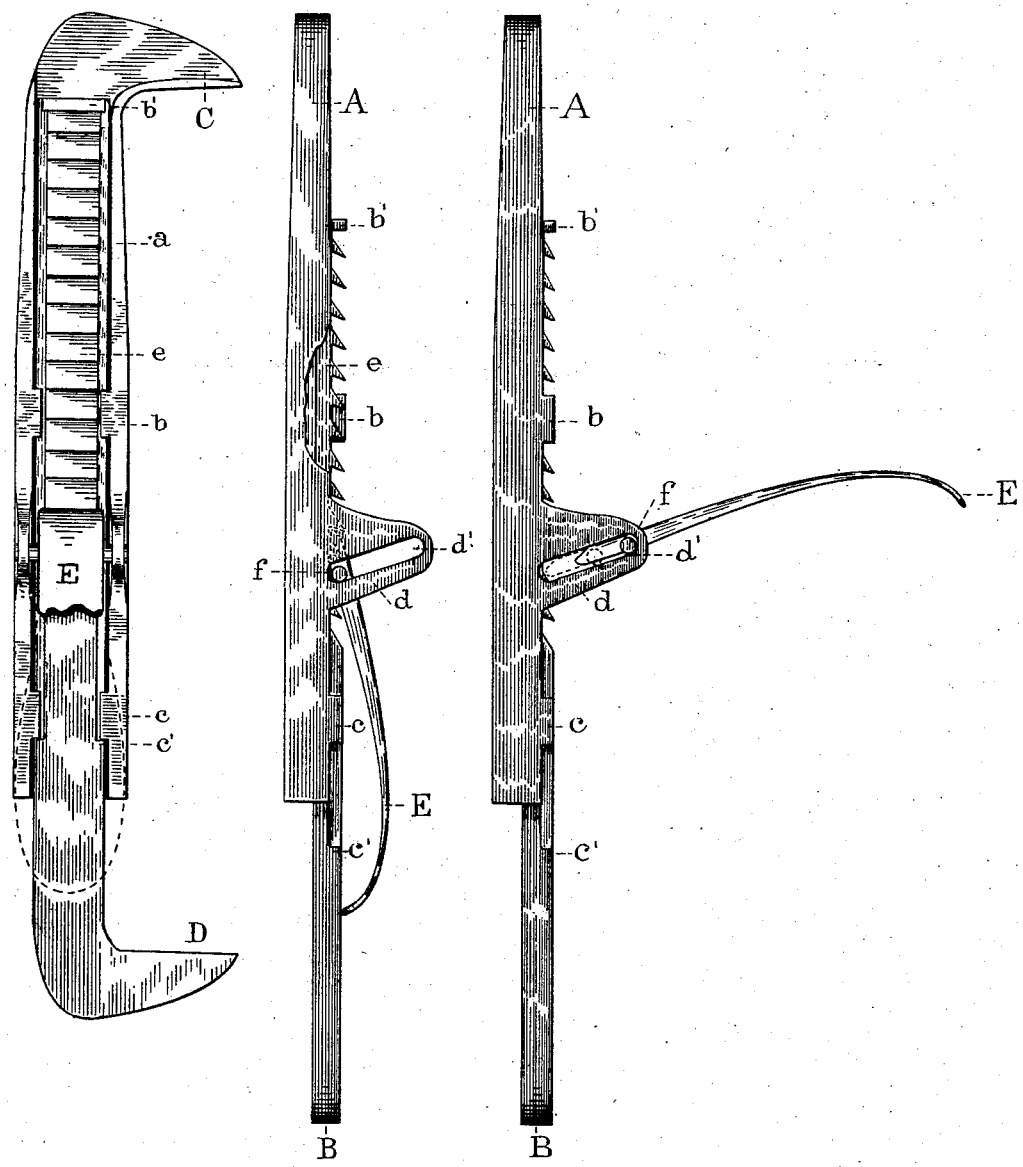

ALVA M. COLT, OF BATAVIA, NEW YORK.

CLAMP.

SPECIFICATION forming part of Letters Patent No. 302,106, dated July 15, 1884.

Application filed May 31, 1884. (No model.)

*To all whom it may concern:*

Be it known that I, ALVA M. COLT, a citizen of the United States, residing at Batavia, in the county of Genesee and State of New York, have invented certain new and useful Improvements in Wood-Clamps; and I do hereby declare the following to be a full, clear, and exact description of the invention, such as will enable others skilled in the art to which it appertains to make and use the same.

The object of my invention is to provide a simple and effective device for operating clamps or other similar articles.

It consists, essentially, of two bars or plates sliding one upon the other, held together by suitable flanges, a lever fulcrumed in inclined slotted bearings on each side of one of the bars, the end of the short arm of the lever being sharpened and engaging with a rack on the sliding bar, and by means of which the clamp is operated. It is strong and durable, is certain in its action, and can be manufactured very cheaply.

The construction and arrangement of the various parts I will now proceed more particularly to point out and describe, reference being had to the accompanying drawings, in which—

Figure 1 is a top plan view; Fig. 2, a side elevation with part of the stationary bar broken away and lever forced down to a clamping position. Fig. 3 is a side elevation showing lever raised and clamp released, dotted lines showing the lower end of the short arm of the lever engaging with the rack-bar.

Referring to said drawings, A is a stationary bar or plate; B, a sliding bar, having on one side a rack, $e$. The bar A is provided with flanges $a$ and lugs $b$ $c$, which hold the two bars together, and the lugs $b$ $c$, in connection with the lugs $b'$ $c'$ on the bar B, also limit the longitudinal motion of the bars with reference to each other and prevent them from being separated.

C D are clamping-jaws projecting rectangularly from the outer ends of the bars A B.

$d$ $d$ are bearings on each side of the bar A, and are provided with slots $d'$ $d'$, said slots inclining toward the end of the short arm of the lever when in a clamping position, or in a direction opposite to the incline of the teeth on the rack-bar B.

E is a lever fulcrumed in the bearings $d$ $d$ by the journals $f$ $f$, which rest in the slots $d'$ $d'$. The end of the short arm of the lever engages with the teeth of the rack $e$. The slots $d'$ $d'$ are longer than the short arm of the lever, so that said lever can be raised clear of the rack $e$ when it is desired to release the clamp.

To use my invention on a clamp, the lever is raised to the position shown in Fig. 3, the jaws C D are placed upon the material to be clamped, and the lever dropped down until the end of its short arm engages with the rack $e$; and by forcing the long arm back to the position shown in Figs. 1 and 2, the clamp is firmly held in place.

I do not propose to limit myself to the use of my invention in connection with clamps alone, for it can be used with great advantage for operating wagon-jacks, carpet-stretchers, or other similar articles.

What I claim as new, and desire to secure by Letters Patent, is—

The bar A, having bearings $d$ $d$, provided with inclined slots $d'$ $d'$, and the sliding rack-bar B, in combination with the lever E, having journals $f$ $f$, and fulcrumed in the inclined slots $d'$ $d'$, substantially as shown and described.

In testimony whereof I affix my signature in presence of two witnesses.

ALVA M. COLT.

Witnesses:
 ALBERT W. TYLER,
 C. W. TALLMAN.